United States Patent
Sugahara et al.

(10) Patent No.: US 7,356,159 B2
(45) Date of Patent: Apr. 8, 2008

(54) RECORDING AND REPRODUCTION APPARATUS, RECORDING AND REPRODUCTION METHOD, RECORDING AND REPRODUCTION PROGRAM FOR IMPERCEPTIBLE INFORMATION TO BE EMBEDDED IN DIGITAL IMAGE DATA

(75) Inventors: Takayuki Sugahara, Yokosuka (JP); Masayoshi Nishitani, Yokosuka (JP); Kenjiro Ueda, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 722 days.

(21) Appl. No.: 10/760,012

(22) Filed: Jan. 15, 2004

(65) Prior Publication Data
US 2004/0146180 A1    Jul. 29, 2004

(30) Foreign Application Priority Data
Jan. 21, 2003    (JP)    ............................... 2003-012544

(51) Int. Cl.
*G06K 9/00*    (2006.01)
*G06K 9/36*    (2006.01)

(52) U.S. Cl. ........................................ 382/100; 382/232

(58) Field of Classification Search ................ 382/100; 380/54
See application file for complete search history.

(56) References Cited

U.S. PATENT DOCUMENTS 5,915,027 A * 6/1999 Cox et al. ...................... 380/54
5,991,426 A * 11/1999 Cox et al. .................... 382/100
6,055,321 A * 4/2000 Numao et al. ............... 382/100

(Continued)

FOREIGN PATENT DOCUMENTS

JP    2000-287065    10/2000

(Continued)

OTHER PUBLICATIONS

Publication "A Copyright Information Embedding Method using DCT for Digital Movies" SCIS'97-31G, The 1997 Symposium on Crytography and Information Security, Fukuoka, Japan, Jan. 29-Feb. 1, 1997, The Institute of Electronics, Information and Communication Engineers.

(Continued)

*Primary Examiner*—Bhavesh M. Mehta
*Assistant Examiner*—Max Shikhman
(74) *Attorney, Agent, or Firm*—Renner, Kenner, Greive, Bobak, Taylor & Weber

(57) ABSTRACT

Digital image data is divided, per frame, into "N" fields. "N/m" combinations of imperceptible codes are produced, each combination having "m" codes given by an inverse of a function giving an identification code with the "m" codes as variables. "N" and "m" are an integer of 2 or more and "m" is given by dividing "N" by an integer. The combinations are embedded into the data to embed the "m" codes of each combination into the data in "m" fields according to a rule of positional correspondence to give correlation among "m" fields in "N" fields. The data is divided into "N" fields and the codes are extracted therefrom and combined into the combinations according to the rule. An operation is conducted based on the function. It is determined that the data has not been tampered with only when the operation gives the identification code for each combination.

6 Claims, 6 Drawing Sheets

U.S. PATENT DOCUMENTS

| | | | |
|---|---|---|---|
| 6,069,914 A * | 5/2000 | Cox | 375/150 |
| 6,108,434 A * | 8/2000 | Cox et al. | 382/100 |
| 6,141,441 A | 10/2000 | Cass et al. | 382/166 |
| 6,154,571 A * | 11/2000 | Cox et al. | 382/250 |
| 6,246,775 B1 | 6/2001 | Nakamura et al. | 382/100 |
| 6,263,087 B1 * | 7/2001 | Miller | 382/100 |
| 6,278,792 B1 * | 8/2001 | Cox et al. | 382/100 |
| 6,438,252 B2 * | 8/2002 | Miller | 382/100 |
| 6,449,380 B1 * | 9/2002 | Acharya et al. | 382/100 |
| 6,512,837 B1 * | 1/2003 | Ahmed | 382/100 |
| 6,546,113 B1 * | 4/2003 | Lucas et al. | 382/100 |
| 6,674,876 B1 * | 1/2004 | Hannigan et al. | 382/100 |
| 6,724,911 B1 * | 4/2004 | Cox et al. | 382/100 |
| 6,738,493 B1 * | 5/2004 | Cox et al. | 382/100 |
| 6,971,010 B1 * | 11/2005 | Abdel-Mottaleb | 713/716 |
| 6,990,213 B2 * | 1/2006 | Donescu | 382/100 |
| 7,174,030 B2 * | 2/2007 | Sugahara et al. | 382/100 |
| 2001/0016052 A1 * | 8/2001 | Miller | 382/100 |
| 2001/0033674 A1 * | 10/2001 | Chen et al. | 382/100 |
| 2002/0009208 A1 * | 1/2002 | Alattar et al. | 382/100 |
| 2002/0021823 A1 | 2/2002 | Muratani | 382/100 |
| 2002/0051560 A1 * | 5/2002 | Donescu et al. | 382/100 |
| 2002/0083324 A1 * | 6/2002 | Hirai | 713/176 |
| 2002/0157005 A1 * | 10/2002 | Brunk et al. | 713/716 |
| 2002/0172398 A1 * | 11/2002 | Hayashi et al. | 382/100 |
| 2003/0161496 A1 * | 8/2003 | Hayashi et al. | 382/100 |
| 2004/0146180 A1 * | 7/2004 | Sugahara et al. | 382/100 |

FOREIGN PATENT DOCUMENTS

| | | |
|---|---|---|
| JP | 2002 223348 | 8/2002 |
| JP | 2002 044429 | 2/2008 |
| WO | WO 98/41017 | 9/1998 |

OTHER PUBLICATIONS

Publication "A Watermarking Scheme to Image Data by PN Sequence" SCIS'97-26B, The 1997 Symposium on Crytography and Information Security, Fukuoka, Japan, Jan. 29-Feb. 1, 1997, The Institute of Electronics, Information and Communication Engineers.

* cited by examiner

RECORDING AND REPRODUCTION APPARATUS, RECORDING AND REPRODUCTION METHOD, RECORDING AND REPRODUCTION PROGRAM FOR IMPERCEPTIBLE INFORMATION TO BE EMBEDDED IN DIGITAL IMAGE DATA

BACKGROUND OF THE INVENTION

The present invention relates to a recording and a reproduction apparatus, a recording and a reproduction method, and a recording and a reproduction program for information to be embedded in digital image data. Particularly, this invention relates to a recording and a reproduction apparatus, a recording and a reproduction method, and a recording and a reproduction program for imperceptible information to be embedded into digital image data by, for example, electronic watermarking, the embedded information being used for determining whether digital image data has been tampered with, especially, in determination of copyright violation when the embedded information is used as copyright information.

With distribution of digital content, images, music, etc., over a communication network, such as, the Internet, becoming popular, several types of technique of embedding an encoded electronic watermarking signal in a digital signal of the content have been proposed for protection of the content against illegal duplication or tampering.

For example, the following three literatures disclose electronic watermarking.

(1) Japanese Unexamined Patent Publication No. 2000-287065

(2) Non-patent literature "A Copyright Information Embedding Method using DCT (Discrete Cosine Transform) for Digital Movies", SCIS' 97-31G, The 1997 Symposium on Cryptography and Information Security, Fukuoka, Japan, Jan. 29-Feb. 1, 1997, The Institute of Electronics, Information and Communication Engineers (3) Non-patent literature "A Watermarking Scheme to Image Data by PN Sequence", SCIS' 97-26B, The 1997 Symposium on Cryptography and Information Security, Fukuoka, Japan, Jan. 29-Feb. 1, 1997, The Institute of Electronics, Information and Communication Engineers In detail, the Japanese Unexamined Patent Publication (1) discloses an image processing system equipped with an image processing unit and an image display device.

The image processing unit provides an original picture resulting from embedding electronic watermark information that can be extracted by using a watermark key, including authentication information which authenticates an image file from a legal server into an original image and provides the watermark key.

The image display device uses the watermark key served by the image processing unit, extracts the electronic watermark information from the original image, stores the original image whose falsification is discriminated by using the watermark key and the watermark key itself, extracts the electronic watermark information from the served original image by using the watermark key served the by an image management server properly serving the original image and the watermark key to a utility destination, and displays the original image whose falsification is discriminated by using the authentication information of the watermark key for a purpose of browsing.

The non-patent literature (2) discloses a new watermarking method which is suitable for MPEG bit stream. The method based on modifying DCT coefficients are better than the method based on modifying the other domain such as motion vectors or quantizer matrices against erasing copyright information attack using editing or compression.

The non-patent literature (3) discloses a data hiding method which uses a PN sequence in the spread spectrum technique. An arrow band signal to stand for a signature is set to a wideband channel of which an image is spread. When converting the spread spectrum to the normal image by PN sequence, inversely, the signature is embedded in wideband channel, which is low in power. Thus, the signature does not give serious damage to the image.

According to the electronic watermarking information embedding techniques described above, electronic watermarking information is recorded through a specific recording or encoding processing so that visual inspection of conversion of image data is almost impossible. The recorded electronic watermarking information is extracted through processing which is the inverse of the recording or encoding processing. It is thus determined whether the image data has been tampered with by checking the extracted electronic watermarking information, irrespective of the type of image-data delivery mechanism (via computers network or storage medium).

Nevertheless in these electronic watermarking information embedding techniques, electronic watermarking information is usually selectively embedded into some local areas of one frame image not in the entire frame image.

This leads to a trouble in that the electronic watermarking information remains unchanged when image data recorded in areas with no watermarking information embedded has been tampered with, thus tampering being undetected.

Moreover, a uniform code information is used as electronic watermarking information and embedded into image data as it is or after encoded by a certain algorism. Such uniform code information is easily extracted once the embedding technique is detected. The embedded content is thus at a high risk of being detected even if it has been encoded.

SUMMARY OF THE INVENTION

A purpose of the present invention is to provided a recording apparatus, a recording method and a recording program for embedding imperceptible information into digital image data and also a reproduction apparatus, a reproduction method and a reproduction program for easily and accurately determining whether image data has been tampered with in any fields of one frame image.

The present invention provides an apparatus for embedding imperceptible codes into digital image data comprising: a data divider to divide, per frame, digital image data into an "N" number of fields ("N" being an integer of 2 or more); a code producer to produce an N/m number of combinations of imperceptible codes, each combination having an "m" number of imperceptible codes given by a function, an inverse of a specific function that gives a specific identification code by using the "m" number of imperceptible codes as variables ("m" being an integer of 2 or more and given by dividing "N" by an integer); and a code embeder to embed the N/m number of combinations of imperceptible codes into image data divided into the "N" number of fields so that the "m" number of imperceptible codes of each combination are embedded into image data in the "m" number of fields according to a specific rule of positional correspondence to give correlation among the "m" number of fields in the "N" number of fields of one frame.

Moreover, the present invention provides an apparatus for extracting imperceptible codes from digital image data comprising: a data divider to divide, per frame, input digital image data into an "N" number of fields ("N" being an integer of 2 or more) according to a specific rule of positional correspondence to give correlation among an "m" number of fields in the "N" number of fields of one frame ("m" being an integer of 2 or more and given by dividing "N" by an integer),the input digital image data carrying imperceptible codes that have been embedded into the input digital image data by dividing, per frame, original digital image data into the "N" number of fields, producing an N/m number of combinations of imperceptible codes, each combination having the "m" number of imperceptible codes given by a function, an inverse of a specific function that gives a specific identification code by using the "m" number of imperceptible codes as variables, and embedding the N/m number of combinations of imperceptible codes into image data divided into the "N" number of fields according to a specific code embedding technique so that the "m" number of imperceptible codes of each combination are embedded into image data in the "m" number of fields according to the rule of positional correspondence; a code extractor to extract the imperceptible codes embedded into the image data divided into the "N" number of fields according to a code extraction technique corresponding to the code embedding technique; a code-pair combiner to combine the extracted imperceptible codes into the N/m number of combinations according to the rule of positional correspondence; a code operator to execute the specific function to conduct a specific operation by using the imperceptible codes of each of the N/m number of combinations as variables; and a determiner to determine that the input digital image data has not been tampered with only when results of the specific operation is equal to specific identification code for all of the N/m number of combinations.

Furthermore, the present invention provides a method of embedding imperceptible codes into digital image data comprising the steps of: dividing, per frame, digital image data into an "N" number of fields ("N" being an integer of 2 or more); producing an N/m number of combinations of imperceptible codes, each combination having an "m" number of imperceptible codes given by a function, an inverse of a specific function that gives a specific identification code by using the "m" number of imperceptible codes as variables ("m" being an integer of 2 or more and given by dividing "N" by an integer); and embedding the N/m number of combinations of imperceptible codes into image data divided into the "N" number of fields so that the "m" number of imperceptible codes of each combination are embedded into image data in the "m" number of fields according to a specific rule of positional correspondence to give correlation among the "m" number of fields in the "N" number of fields of one frame.

Furthermore, the present invention provides a method of extracting imperceptible codes from digital image data comprising the steps of: dividing, per frame, input digital image data into an "N" number of fields ("N" being an integer of 2 or more) according to a specific rule of positional correspondence to give correlation among an "m" number of fields in the "N" number of fields of one frame ("m" being an integer of 2 or more and given by dividing "N" by an integer), the input digital image data carrying imperceptible codes that have been embedded into the input digital image data by dividing, per frame, original digital image data into the "N" number of fields, producing an N/m number of combinations of imperceptible codes, each combination having the "m" number of imperceptible codes given by a function, an inverse of a specific function that gives a specific identification code by using the "m" number of imperceptible codes as variables, and embedding the N/m number of combinations of imperceptible codes into image data divided into the "N" number of fields according to a specific code embedding technique so that the "m" number of imperceptible codes of each combination are embedded into image data in the "m" number of fields according to the rule of positional correspondence; extracting the imperceptible codes embedded into the image data divided into the "N" number of fields according to a code extraction technique corresponding to the code embedding technique; combining the extracted imperceptible codes into the N/m number of combinations according to the rule of positional correspondence; executing the specific function to conduct a specific operation by using the imperceptible codes of each of the N/m number of combinations as variables; and determining that the input digital image data has not been tampered with only when results of the specific operation is equal to specific identification code for all of the N/m number of combinations.

Still, furthermore, the present invention provides a computer-implemented method of embedding imperceptible codes into digital image data comprising the steps of: dividing, per frame, digital image data into an "N" number of fields ("N" being an integer of 2 or more); producing an N/m number of combinations of imperceptible codes, each combination having an "m" number of imperceptible codes given by a function, an inverse of a specific function that gives a specific identification code by using the "m" number of imperceptible codes as variables ("m" being an integer of 2 or more and given by dividing "N" by an integer); and embedding the N/m number of combinations of imperceptible codes into image data divided into the "N" number of fields so that the "m" number of imperceptible codes of each combination are embedded into image data in the "m" number of fields according to a specific rule of positional correspondence to give correlation among the "m" number of fields in the "N" number of fields of one frame.

Still, furthermore, the present invention provides a computer-implemented method of extracting imperceptible codes from digital image data comprising the steps of: dividing, per frame, input digital image data into an "N" number of fields ("N" being an integer of 2 or more) according to a specific rule of positional correspondence to give correlation among an "m" number of fields in the "N" number of fields of one frame ("m" being an integer of 2 or more and given by dividing "N" by an integer), the input digital image data carrying imperceptible codes that have been embedded into the input digital image data by dividing, per frame, original digital image data into the "N" number of fields, producing an N/m number of combinations of imperceptible codes, each combination having the "m" number of imperceptible codes given by a function, an inverse of a specific function that gives a specific identification code by using the "m" number of imperceptible codes as variables, and embedding the N/m number of combinations of imperceptible codes into image data divided into the "N" number of fields according to a specific code embedding technique so that the "m" number of imperceptible codes of each combination are embedded into image data in the "m" number of fields according to the rule of positional correspondence; extracting the imperceptible codes embedded into the image data divided into the "N" number of fields according to a code extraction technique corresponding to the code embedding technique; combining the extracted imperceptible codes into the N/m number of combinations according to the rule of positional correspondence; executing the specific function to conduct a specific operation by using the imperceptible codes of each of the N/m number of combinations as variables; and determining that the input digital image data has not been tampered with only when results of the specific operation is equal to specific identification code for all of the N/m number of combinations.

DETAILED DESCRIPTION OF PREFERRED EMBODIMENT

Several embodiments according to the present invention will be disclosed with reference to the attached drawings.

First Embodiment

Figures 1, 2:
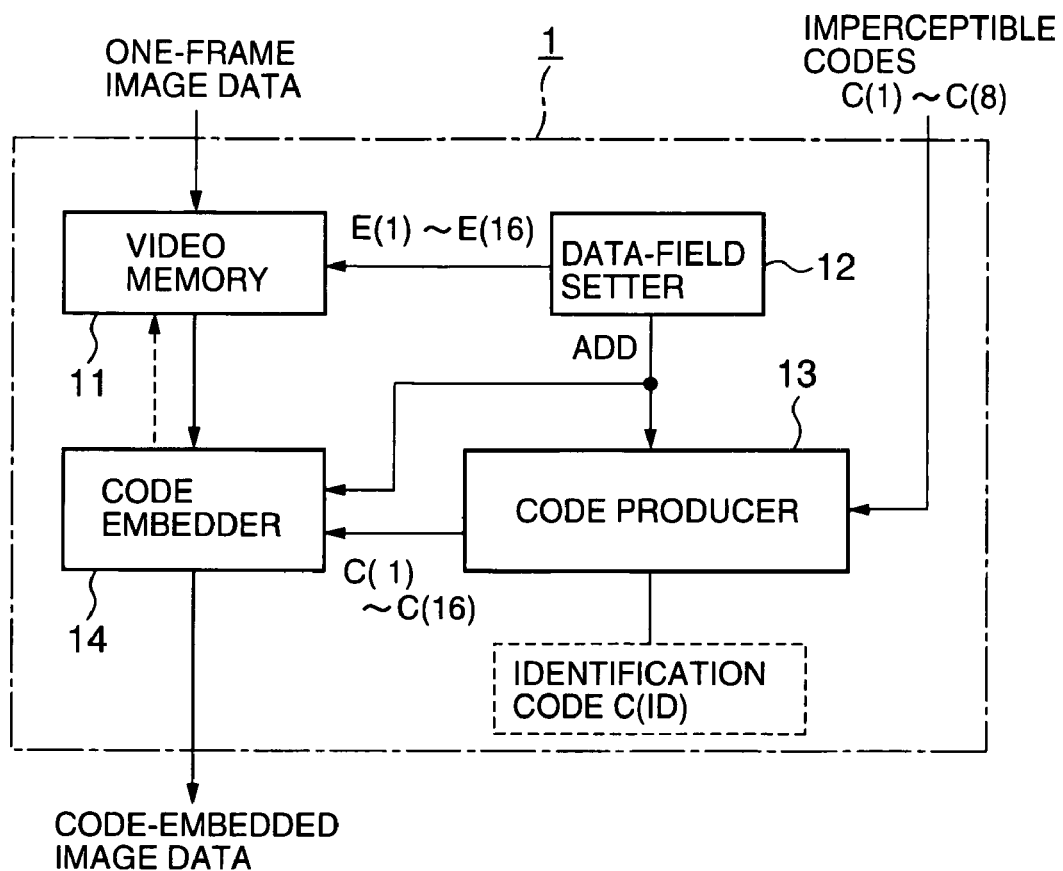
FIG. 1 shows a block diagram of an embodiment of a recording apparatus for embedding imperceptible codes into digital image data according to the present invention.
FIG. 2 illustrates division of one-frame digital image data into several fields and imperceptible codes embedded into the divided image data in the fields.

FIG. 1 shows a block diagram of an embodiment of a recording apparatus for embedding imperceptible codes into digital image data.

A recording apparatus 1 shown in FIG. 1 is equipped with: a video memory 11 for storing at least one-frame digital image data; a data-field setter 12 for dividing the stored image data into 16 pieces of data (each called field image data hereinafter); a code producer 13 for receiving externally input imperceptible codes $C(1)$ to $C(8)$ and producing imperceptible codes $C(1)$ to $C(16)$ by using the codes $C(1)$ to $C(8)$ and preset identification code $C(ID)$; and a code embeder 14 for embedding the imperceptible codes $C(1)$ to $C(16)$ into the 16 field image data, respectively.

In operation, once external one-frame image data is stored in the video memory 11, it is divided by the data-field setter 12 into four in a vertical direction and also in a horizontal direction, or 16 field image data in total in 16 fields $E(1)$ to $E(16)$, as illustrated in FIG. 2. The data-field setter 12 is equipped with a frame memory for this operation.

The 16 field image data are read out from the video memory 11 to the code embeder 14 one by one in accordance with field address data (ADD) for the 16 fields used in data division at the data-field setter 12.

The imperceptible codes $C(1)$ to $C(8)$ are externally input to the code producer 13 that is equipped with exclusive-OR circuitry. The codes $C(1)$ to $C(8)$ are embedded into the field image data in the fields $E(1)$ to $E(8)$, respectively, as disclosed below in detail.

As illustrated in FIG. 2, the fields $E(1)$ to $E(8)$ and the $E(16)$ to $E(9)$ are correlated with each other a shaving point symmetry at a point 15, the center of the frame image data.

Once the imperceptible codes $C(1)$ to $C(8)$ are embedded into the field image data in the fields $E(i)$ [$i=1$ to 8], the imperceptible codes $C(16)$ to $C(9)$ given by the following formulas (1) are embedded into the field image data in the fields $E(17-i)$ [$i=1$ to 8].

$$C(16)=C(1) \text{ xor } C(ID), C(15)=C(2) \text{ xor } C(ID)$$

$$C(14)=C(3) \text{ xor } C(ID), C(13)=C(4) \text{ xor } C(ID)$$

$$C(12)=C(5) \text{ xor } C(ID), C(11)=C(6) \text{ xor } C(ID)$$

$$C(10)=C(7) \text{ xor } C(ID), C(9)=C(8) \text{ xor } C(ID) \tag{1}$$

According to the formulas (1), the imperceptible codes $C(i)$ [$i=1$ to 8] for the field image data in the fields $E(i)$ [$i=1$ to 8] are logically exclusive-ORed with the identification code $C(ID)$. In each formula (1), an operator "xor" means a logical exclusive-OR operation. The resultant imperceptible codes $C(17-i)$ [$i=1$ to 8] are then embedded into the field image data in the fields $E(17-i)$ [$i=1$ to 8].

As an example, an ASCII (trademark)-hexadecimal code "0x544552414441" corresponding to a 6-character word "TERADA" as the code $C(1)$ for the field $E(1)$ is exclusive-ORed with an ASCII-hexadecimal code "0x564943544F52" corresponding to a 6-character word "VICTOR" as the identification code $C(ID)$. The resultant code $C(16)$, "0x030C11150BB13", is embedded in the field image data in the field $E(16)$.

As disclosed, the code producer 13 employs an exclusive-OR function to perform the formulas (1) for exclusive-OR operation.

It is one of the features of the present invention that the codes $C(17-i)$ [$i=1$ to 8] to be embedded are given so that the identification code $C(ID)$ is given by each exclusive-OR operation between one of the codes $C(i)$ [$i=1$ to 8] to be embedded into the fields $E(i)$ [$i=1$ to 8] and the corresponding code $C(17-i)$ [$i=1$ to 8] to be embedded into the fields $E(17-i)$ [$i=1$ to 8].

This feature allows the formulas (1), the exclusive-OR operations between the codes $C(i)$ [$i=1$ to 8] and the identification code $C(ID)$, to give the codes $C(17-i)$ [$i=1$ to 8].

In FIG. 1, the code embeder 14 sends a request signal to the video memory 11 to read out the field image data therefrom. It further reads out pixel addresses (ADD) on the frame memory of the data-field setter 12 to determine whether the read-out field image data are those for the fields $E(i)$ [$i=1$ to 8] or the fields $E(i)$ [$i=9$ to 16].

In detail, when the field image data read out to the code embeder 14 are those for the fields $E(i)$ [$i=1$ to 8], the code producer 13 transfers the codes $C(i)$ [$i=1$ to 8] to the code embeder 14, with no modification. The code embeder 14 then embeds the codes $C(i)$ [$i=1$ to 8] into the field image data in the fields $E(i)$ [$i=1$ to 8].

In contrast, when those field image data are for the fields $E(i)$ [$i=9$ to 16], the code embeder 14 embeds the codes $C(i)$ [$i=9$ to 16] given by the formulas (1) into the field image data in the fields $E(i)$ [$i=9$ to 16].

The imperceptible codes may be embedded into the field image data according to the known electronic watermarking technologies discussed first. Or, the imperceptible codes may be formed with a bit train of the least significant bit (LSB) or the LSB-side 2 bits of, for example, intensity data in each macroblock of image data in each filed E(i).

The imperceptible codes C(i) [i=1 to 16] embedded into the field image data by the recording apparatus 1, as disclosed above, correspond to the fields E(i) [i=1 to 16]. In addition, each embedded code C(i) [i=1 to 16] is formed as having a pair of codes having correlation with each other so that they are point symmetrical at the point 15, the center of the frame image data, as shown in FIG. 2. Moreover, the codes of each pair have correlation with each other so that an exclusive-OR operation between them gives the identification code C(ID).

The correlation for the exclusive-OR operation is given according to a rule of inframe positional correspondence used at the code embeder 14.

The code-embedded image data output from the recording apparatus 1 are recorded on storage media and brought into market. Or, they are distributed over a communications network, such as, the Internet.

Figure 3:
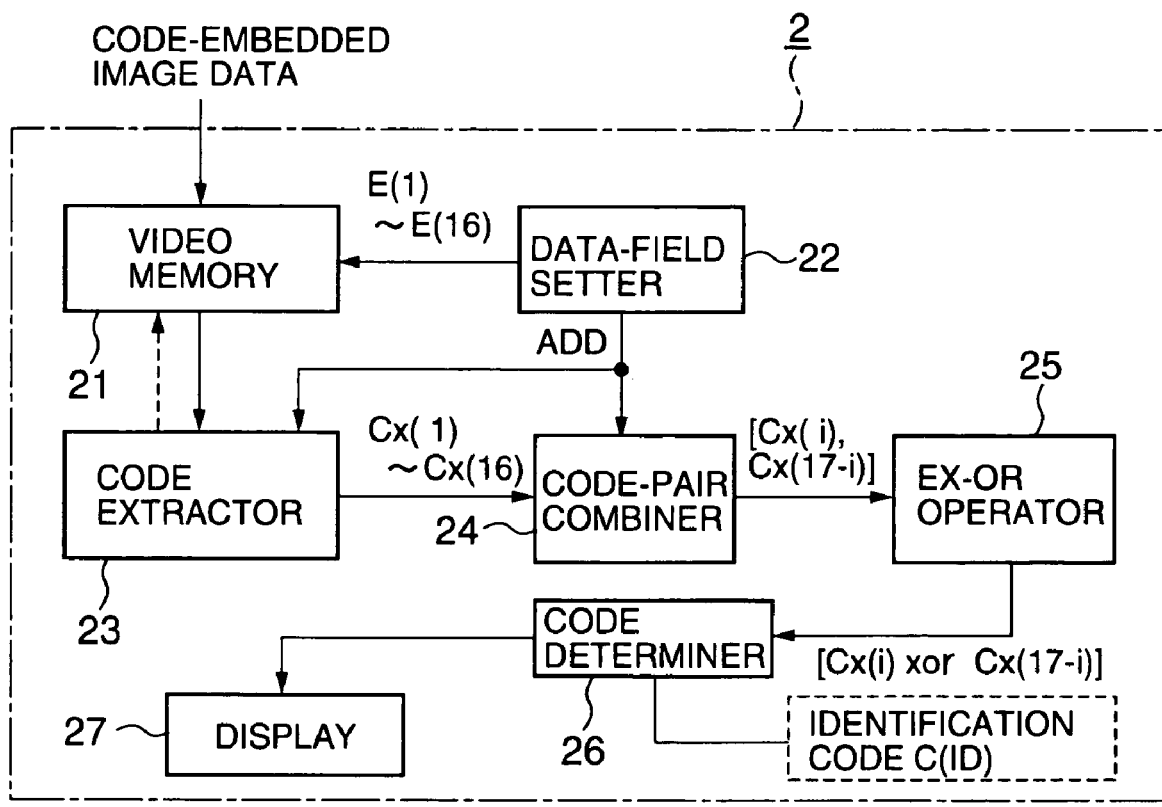
FIG. 3 shows a block diagram of an embodiment of a reproduction apparatus for reproducing embedded imperceptible codes from digital image data, which is compatible with the recording apparatus 1 shown in FIG. 1.

FIG. 3 shows a block diagram of an embodiment of a reproduction apparatus for reproducing embedded imperceptible codes from digital image data, which is compatible with the recording apparatus 1 shown in FIG. 1.

A reproduction apparatus 2 shown in FIG. 3 is equipped with: a video memory 21 for storing at least one-frame digital image data; a data-field setter 22 for dividing the stored image data into 16 pieces of data (each called field image data hereinafter); a code extractor 23 for extracting imperceptible codes embedded in the 16 field image data; a code-pair combiner 24 for combining two codes correlated with each other into a code pair among the extracted codes, thus creating several code pairs; an exclusive-OR (EX-OR) operator 25 for performing an exclusive-OR operation between the codes of each pair; a code determiner 26 for determining whether each EX-OR resultant code is equal to the identification code C(ID) disclosed with respect to FIG. 1; and a display 27 for displaying the results given by the code determiner 26.

In operation, once external one-frame image data is stored in the video memory 21, it is divided by the data-field setter 22 into the fields E(1) to E(16) in the same way as explained with respect to FIG. 2.

The imperceptible codes embedded in the fields E(1) to E(16) are exactly the codes C(1) to C(16) when the image data has not been tampered with after output from the recording apparatus 1 shown in FIG. 1.

In the following disclosure, the embedded codes are expressed as Cx(1) to Cx(16) because it is not known at this stage whether or not the image data has been tampered with.

The code extractor 23 sends a request signal to the video memory 21 to read out therefrom the image data in the fields E(1) to E(16) one by one in accordance with field address data (ADD) for the fields E(1) to E(16) used in data division at the data-field setter 22.

The code extractor 23 extracts the embedded imperceptible codes Cx(1) to Cx(16) from the field image data in the fields E(1) to E(16) according to an extraction technique that corresponds to the embedding technique used at the code embeder 14 (FIG. 1) in recording.

The imperceptible codes Cx(1) to Cx(16) carry 8 pairs of codes Cx(i) and Cx(17−i) [i=1 to 8] correlated with each other. In detail, a pair of codes [Cx(1), Cx (16)] are correlated with each other in the exclusive-OR function. This is the same for other code pairs [Cx(2), Cx(15)], [Cx(3), Cx(14)], [Cx(4), Cx(13)], [Cx(5), Cx(12)], [Cx(6), Cx(11)], [Cx(7), Cx(10)], and [Cx(8), Cx(9)].

As explained with reference to FIG. 2, the correlated codes of each pair are those for the fields having point symmetry. Thus, two correlated codes are combined into one pair according to the rule of inframe positional correspondence used at the code embeder 14 (FIG. 1) in recording.

This code combination is achieved at the code-pair combiner 24 in accordance with field address data (ADD) for the 16 fields used in data division at the data-field setter 22. The resultant each code pair is transferred to the EX-OR operator 25.

The EX-OR operator 25 performs an exclusive-OR operation between the codes of each pair Cx(i) and Cx(17−i) [i=1 to 8] according to the following formulas (2).

$$Cx(1) \text{ xor } Cx(16), Cx(2) \text{ xor } Cx(15)$$

$$Cx(3) \text{ xor } Cx(14), Cx(4) \text{ xor } Cx(13)$$

$$Cx(5) \text{ xor } Cx(12), Cx(6) \text{ xor } Cx(11)$$

$$Cx(7) \text{ xor } Cx(10), Cx(8) \text{ xor } Cx(9) \qquad (2)$$

The EX-OR operator 25 gives the identification code C(ID) set at the recording apparatus 1 (FIG. 1) for all code pairs through the exclusive-OR operation when the image data provided through the recording apparatus 1 has not been tampered with. Then, the results of exclusive-OR operation at the EX-OR operator 25 are transferred to the code determiner 26.

The code determiner 26 compares the EX-OR resultant codes from the EX-OR operator 25 and the preset identification code C(ID). In detail, each EX-OR resultant code and the preset identification code C (ID) are compared with each other per-bit-based exclusive-OR operation. The exclusive-OR operation gives "0" when one of bits of each EX-OR resultant code and the corresponding bit of the identification code C (ID) are equal to each other whereas "1" when these bits are different from each other. The results of per-bit-based exclusive-OR operations are ORed for all bits. An ORed result "0" indicates that all bits are equal to each other between each EX-OR resultant code and the identification code C(ID).

It is thus determined at the code determiner 26 that the image data provided through the recording apparatus 1 has not been tampered with when all EX-OR resultant codes are equal to the preset identification code C(ID) whereas determined that the image data has been tampered with when at least one EX-OR resultant code is not equal to the code C(ID).

The result of determination at the code determiner 26 is transferred to the display 27 and displayed thereon. The display 27 displays at least as to whether or not the image data has been tampered with. In addition, it can display any field of tampered frame image data when the image data has been tampered with, thanks to the code determiner 26 that can determine which EX-OR resultant code(s) is(are) not equal to the identification code C(ID).

As disclosed in detail, according to the first embodiment of recording and reproduction apparatuses, one frame of image data is divided into 16 fields in which the imperceptible codes disclosed above are embedded. These frame-division and code-embedding techniques thus offer accurate determination of tampering even if a small portion of image data has been tampered with.

Moreover, according to the first embodiment of recording and reproduction apparatuses, even if the code-embedding technique is illegally detected, the detected codes are random codes and hence it is almost impossible to find out the rule of codes. Therefore, the present invention offers robust protection of image contents against tampering.

In addition, copyright information can be modified as the identification code C(ID) which can prove copyright of image contents.

Second Embodiment

Disclosed in the second embodiment is software that achieves several functions of the imperceptible-information recoding and reproduction apparatuses in the first embodiment.

Figure 4:
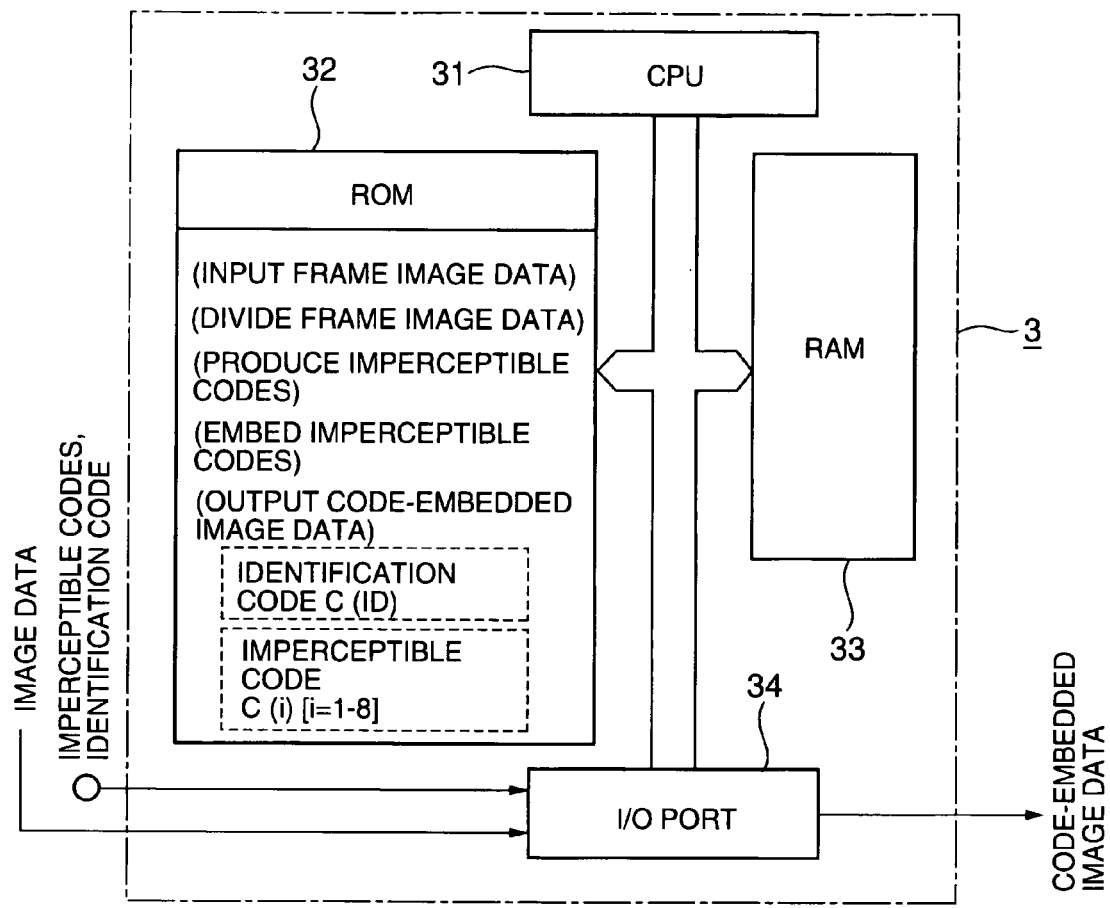
FIG. 4 shows a block diagram of an embodiment of a microcomputer circuit programmed for embedding imperceptible codes into digital image data.

FIG. 4 shows a block diagram of an embodiment of a microcomputer circuit programmed for embedding imperceptible codes into digital image data.

A recording microcomputer circuit 3 shown in FIG. 4 is equipped with a CPU 31, a ROM 32, a RAM 33 and an I/O port 34.

Input to the recording microcomputer circuit 3 via the I/O port 34 are digital image data, imperceptible codes C(i) [i=1 to 8] and identification code C(ID).

Output from the recording microcomputer circuit 3 via the I/O port 34 are digital image data into which imperceptible codes C(i) [i=1 to 16] are embedded, as disclosed below.

Stored in the ROM 32 are several program modules for achieving the functions of the imperceptible-information recoding apparatus shown in FIG. 1.

The CPU 31 executes embedding of the imperceptible codes C(i) [i=1 to 16] into digital image data in accordance with the program modules while utilizing the RAM 33 as a video memory and a work area.

Figure 5:
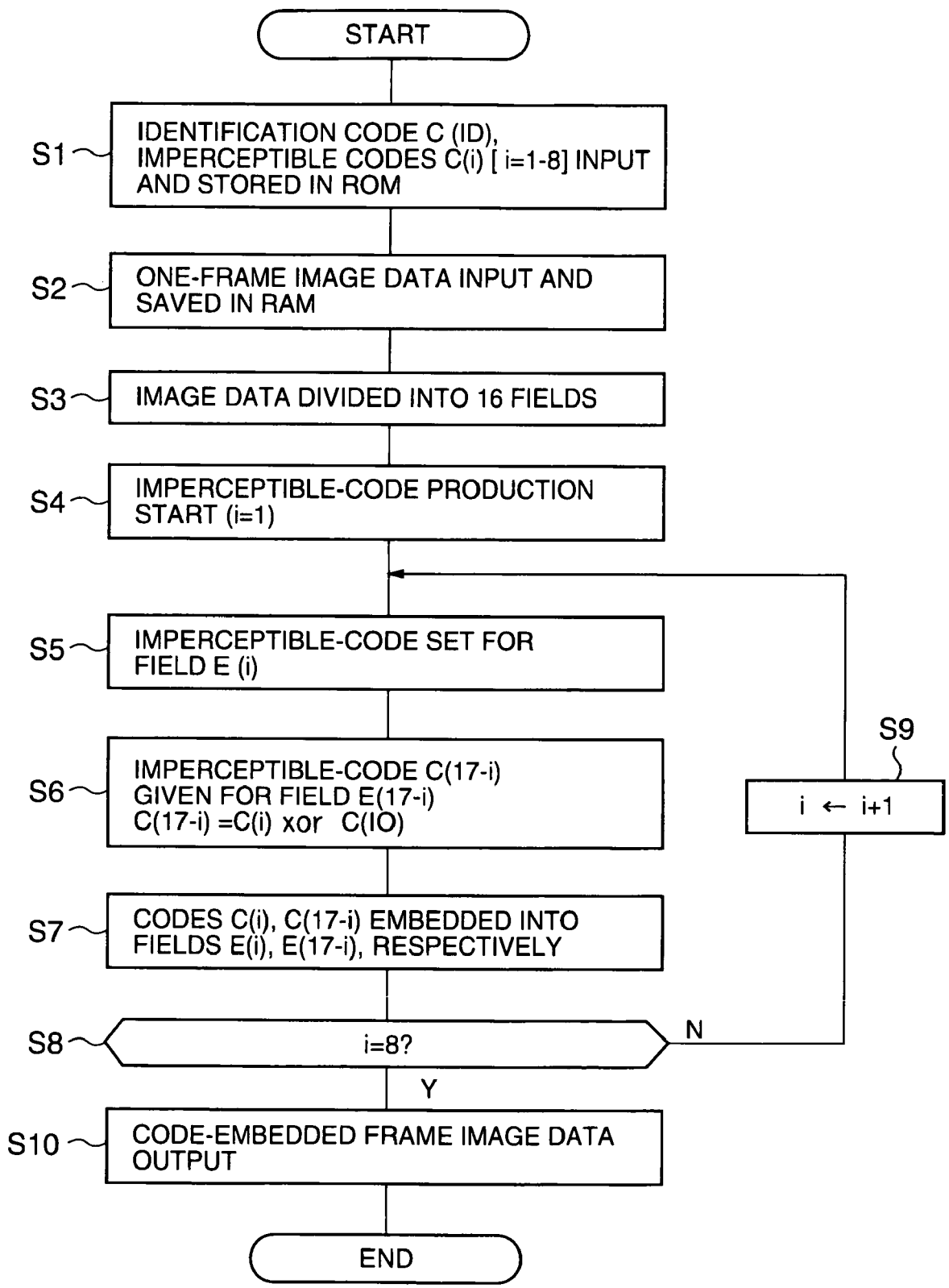
FIG. 5 shows a flowchart indicating a software program that runs on the recording microcomputer circuit shown in FIG. 4.

A software program that runs on the recording microcomputer circuit 3 is disclosed with respect a flowchart shown in FIG. 5.

In step S1, the identification code C(ID) and the imperceptible codes C(i) [i=1 to 8] are input and prestored in the ROM 32.

One-frame image data is input and saved in the RAM 33 in step S2. A data-field setting program module prestored in the ROM 32 starts in step S3 to divide the saved one-frame image data into 16 pieces of data (each called field image data hereinafter) in fields E(1) to E(16), as illustrated in FIG. 2.

An imperceptible-code producing program module prestored in the ROM 32 starts (a variable "i"=1) instep S4. An imperceptible code C(1) is set for field image data in the field E(1) in step S5. An exclusive-OR operation between the code C(1) and the identification code C(ID) is conducted to give an imperceptible code C(16) for field image data in the field E(16) in step S6.

A code embedding program module prestored in the ROM 32 starts in step S7 to embed the codes C(1) and C(16) into the field image data in the fields E(1) and E(16), respectively.

The program written in the code embedding program module maybe the known electronic watermarking technique discussed first or a code-forming technique of forming codes with a bit train of the least significant bit (LSB) or the LSB-side 2 bits of, for example, intensity data in each macroblock of image data in each filed E(i), as disclosed in the first embodiment.

Also written in the code embedding program module is a program for embedding the codes C(i) [i=1 to 8] into the field image data in the fields E(i) [i=1 to 8] and the codes C(17−i) [i=1 to 8], the results of exclusive-OR operation between the codes C(i) [i=1 to 8] and the identification code C(ID), into the field image data in the fields E(17−i) [i=1 to 8].

It is determined in step S8 whether or not the variable "i" reaches "8". If not, the value "1" is added to the variable "i" in step S9.

Since the variable "i" is "1", the value "1" is added to the variable "i", the process returns to step S5 via step S9 to set an imperceptible code C(2) for field image data in the field E(2). An exclusive-OR operation between the code C(2) and the identification code C(ID) is conducted to give an imperceptible code C(15) for field image data in the field E(15) in step S6. The codes C(2) and C(15) are then embedded into the field image data in the fields E(2) and E(15), respectively, in step S7.

It is determined in step S8 whether or not the variable "i" reaches "8". Since the variable "i" does not reach "8", the process returns to step S5 via step S9 to repeat the imperceptible-code producing and code-embedding programs from step S5 to step S7: setting imperceptible codes C(3) to C(8); obtaining imperceptible codes C(14) to C(9); and embedding these codes into the field image data in the fields E(3) to E(8) and E(14) to E(9), respectively.

Steps S5 to S8 are repeated via step S9 until the variable "i" reaches "8" in step S8.

The one-frame image data into which the imperceptible codes C(1) to C(16) have been embedded is output from the recording microcomputer circuit 3 via the I/O port 34, as shown in FIG. 4.

Code-embedded image data output from the recording microcomputer circuit 3, as disclosed above, are recorded on storage media and brought into market. Or, they are distributed over a communications network, such as, the Internet.

Figure 6:
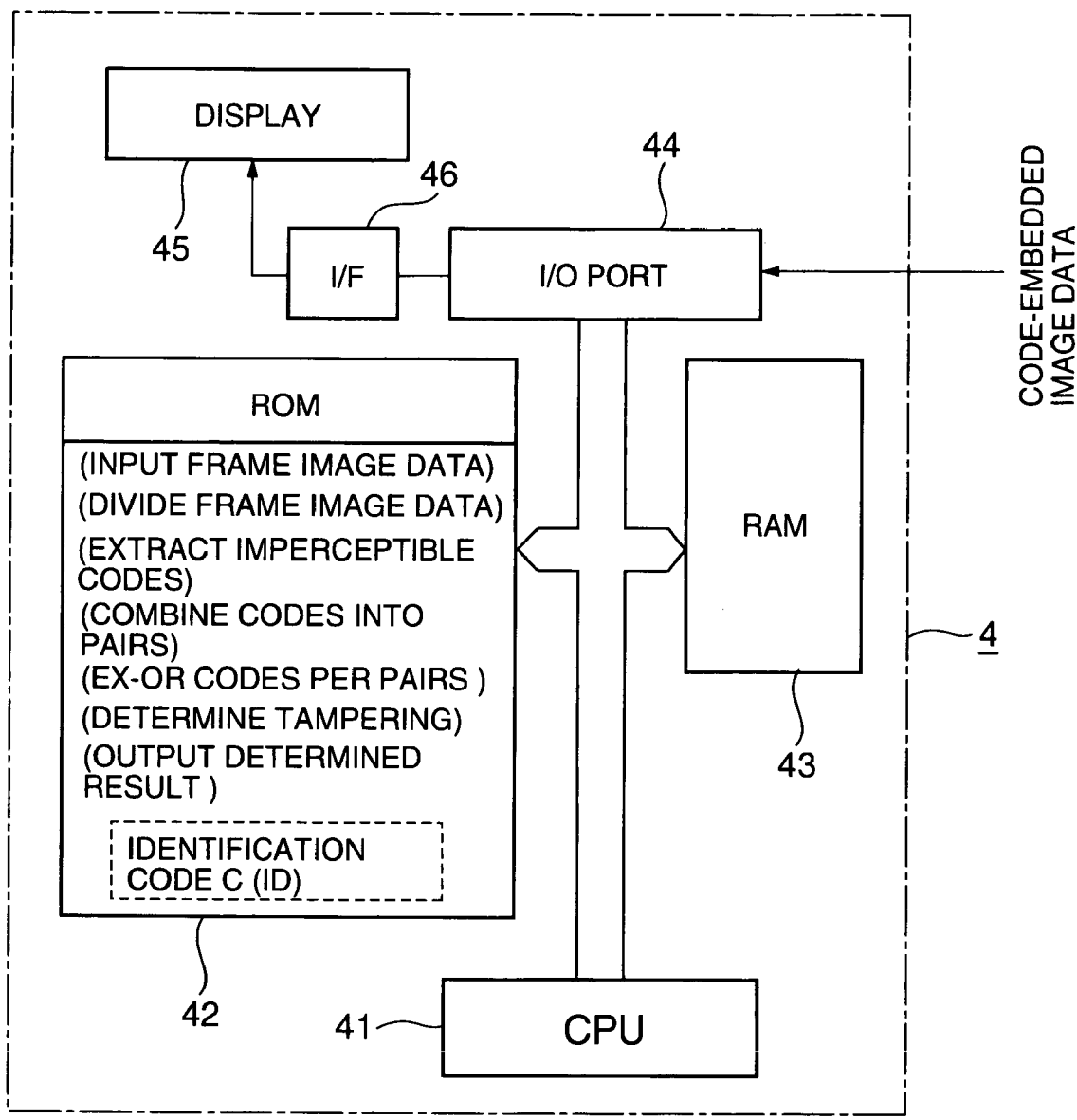
FIG. 6 shows a block diagram of an embodiment of a microcomputer circuit programmed for reproducing embedded imperceptible codes from digital image data, which is compatible with the recording microcomputer circuit shown in FIG. 4.

FIG. 6 shows a block diagram of an embodiment of a microcomputer circuit programmed for reproducing embedded imperceptible codes from digital image data, which is compatible with the recording microcomputer circuit 3 shown in FIG. 4.

A reproduction microcomputer circuit 4 shown in FIG. 6 is equipped with a CPU 41, a ROM 42, a RAM 43, an I/O port 44, a display interface (I/F) 46 and a display 45.

The reproduction microcomputer circuit 4 receives, via the I/O port 44, digital image data into which imperceptible codes have been embedded through the recording microcomputer circuit 3 (FIG. 4) and determines, based on the embedded codes, whether or the digital image data have been tampered with.

Stored in the ROM 42 are several program modules for achieving the functions of the imperceptible-information reproduction apparatus shown in FIG. 3.

The CPU 41 executes reproduction of the imperceptible codes embedded into the digital image data in accordance with the program modules while utilizing the RAM 43 as a video memory and a work area.

Figure 7:
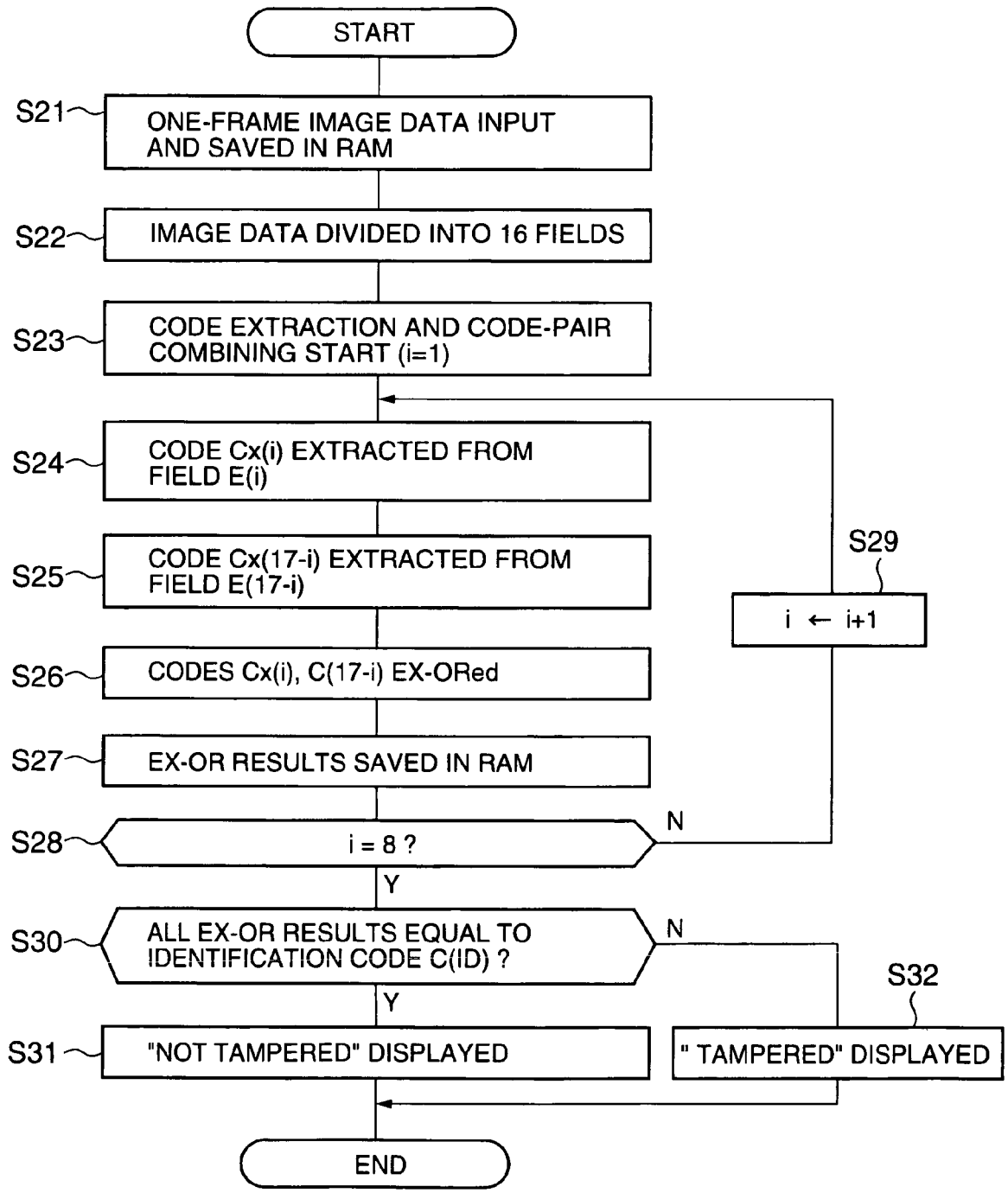
FIG. 7 shows a flowchart indicating a software program that runs on the recording microcomputer circuit shown in FIG. 6.

A software program that runs on the reproduction microcomputer circuit 4 is disclosed with respect a flowchart shown in FIG. 7.

In step S21, one-frame image data is input and saved in the RAM 43. A data-field setting program module prestored in the ROM 42 starts in step S22 to divide the saved one-frame image data into 16 pieces of data (each called field image data hereinafter) in fields E(1) to E(16), in the same way as step S3 (FIG. 5) in recording.

A code extraction program module and a code-pair combining program module both prestored in the ROM 42 start (a variable "i"=1) in step S23.

An imperceptible code Cx(1) embedded into field image data in a field E(1) is extracted in step S24. Moreover, an imperceptible code Cx(16) embedded into field image data in a field E(16) is extracted in step S25.

The program written in the code extraction program module corresponds to the imperceptible-code embedding technique installed in the recording microcomputer circuit 3 shown in FIG. 3. In addition, the code-pair combining program module corresponds to the code embedding program module installed in the recording microcomputer circuit 3.

In other words, written in the code extraction and code-pair combining program modules are the programs for extracting an imperceptible code Cx(i) embedded into field image data in a region E(i) and then an imperceptible code Cx(17−i), correlated to the code Cx(i), embedded into field image data in a region E(17−i), which are those of a code pair combined according to the rule of inframe positional correspondence installed in the recording microcomputer circuit 3.

Once imperceptible codes Cx(1) and Cx(16), a pair of codes, are extracted in steps S24 and S25, an exclusive-OR (EX-OR) operation program module prestored in the ROM 42 starts to perform an exclusive-OR operation between the codes Cx(1) and Cx(16) in step S26. The EX-OR resultant code is saved in the RAM 43 in step S27.

It is determined in step S28 whether or not the variable "i" reaches "8". If not, the value "1" is added to the variable "i" in step S29.

Since the variable "i" is "1", the value "1" is added to the variable "i", the process returns to steps S24 and S25 via step S29 to extract imperceptible codes Cx(2) and Cx(15) embedded into field image data in fields E(2) and E(15), respectively.

An exclusive-OR operation is performed between the codes Cx(2) and Cx(15) in step S26, and the EX-OR resultant code is saved in the RAM 43 in step S27.

It is determined in step S28 whether or not the variable "i" reaches "8". Since the variable "i" does not reach "8", the process returns to step S24 via step S29 to repeat the code extraction and code-pair combining programs from step S24 to step S27: extracting imperceptible codes Cx(3) to Cx(8) embedded into field image data in fields E(3) to E(8), respectively, and the corresponding imperceptible codes Cx(14) to Cx(9) embedded into field image data in fields E(14) to E(9), respectively; performing an exclusive-OR operation between each code pair; and saving each EX-OR resultant code in the RAM 43. Accordingly, eight EX-OR resultant codes are saved in the RAM 43.

In this embodiment, each of the saved EX-OR resultant codes is equal to the identification code C(ID) when the codes Cx(1) to Cx(16) extracted at the reproduction microcomputer circuit 4 (FIG. 6) are equal to the codes C(1) to C(16) embedded at the recording microcomputer circuit 3 (FIG. 4), or when the image data provided through the circuit 3 has not been tampered with.

Therefore, in step S30, each of the saved EX-OR resultant codes is compared with the identification code C(ID) stored in the ROM 42, to give determination that the image data provided through the recording microcomputer circuit 3 has not been tampered with when all saved codes are equal to the code C(ID) whereas it has been tampered with when at least one code is not equal to the code C(ID).

The result of determination is transferred from the CPU 41 to the display 45 via the I/O port 44 and the display interface 46 and displayed thereon in step S31 or S32.

The display 45 displays at least as to whether or not the image data has been tampered with. In addition, it can display information on field(s) corresponding to a code pair (pairs) for which the EX-OR resultant code(s) is(are) not equal to the identification code C(ID) when it is determined that the image data has been tampered with.

The software or each program module disclosed above can be installed in the recording microcomputer circuit 3 or the reproduction microcomputer circuit 4 from a storage medium or downloaded through a network, such as, the Internet.

[Modifications]

Although one-frame image data is divided into 16 field image data in the first and second embodiments, it can be divided into a larger number of field image data for more robust imperceptible-code recording and preproduction system with higher tamper-determination performance.

The first and second embodiments employ the exclusive-OR function as disclosed above. Choice is, however, not such function only. The minimum requirement for feasible functions is that a function employed in reproduction gives a specific identification code with embedded imperceptible codes of each pair as variables while another function employed in recording, the reverse of the function employed in reproduction, gives those imperceptible codes.

In the embodiments disclosed above, for example, a function feasible for reproduction is C(ID)=a*C(i)+b*C(17−i), where an operator "*" means multiplication, and "a" and "b" are a constant, which gives each pair of codes C(i) and C(17−i) [i=1 to 8] that provides each formula (1) in recording.

Moreover, not only a pair of imperceptible codes employed in the embodiments, but also a combination of three or more of imperceptible codes can be employed in this invention.

Furthermore, the rule of positional correspondence in frame image data feasible in this invention is not only based on the point symmetrical relationship employed in the embodiments but also other relationships which give correlation between two codes of each pair or among several codes of combination.

One requirement for each modification disclosed above is that it is compatible between imperceptible-code recording and reproduction.

As disclosed above in detail, according to the present invention, in imperceptible-code recording, digital image data is divided, per frame, into an "N" number of fields ("N" being an integer of 2 or more). An N/m number of combinations of imperceptible codes are produced. Each combination has an "m" number of imperceptible codes given by a function, an inverse of a specific function that gives a specific identification code by using the "m" number of imperceptible codes as variables ("m" being an integer of 2 or more and given by dividing "N" by an integer).

The N/m number of combinations of imperceptible codes are embedded into image data divided into the "N" number of fields according to a specific code embedding technique so that the "m" number of imperceptible codes of each combination are embedded into image data in the "m" number of fields according to a specific rule of positional correspondence to give correlation among the "m" number of fields in the "N" number of fields of one frame.

Moreover, according to the present invention, in imperceptible-code reproduction, the code-embedded digital image data is divided, per frame, into the "N" number of fields. The imperceptible codes are extracted from the image data divided into the "N" number of fields according to a code extraction technique corresponding to the code embedding technique.

The extracted imperceptible codes are combined into the N/m number of combinations according to the rule of positional correspondence. The specific function is executed to conduct a specific operation by using the imperceptible codes of each of the N/m number of combinations as variables.

It is determined that the input digital image data has not been tampered with only when results of the specific operation is equal to specific identification code for all of the N/m number of combinations.

Therefore, according to the present invention, tampered digital image data is always accurately detected when it is provided, for example, through storage media or over a communications network.

Moreover, according to the present invention, even if the code-embedding technique is illegally detected, the detected codes are random codes and hence it is almost impossible to find out the rule of codes. Therefore, the present invention offers robust protection of image contents against tampering.

Furthermore, according to the present invention, determination of tapering is easily made with use of a specific identification code. The identification code in this invention can be used as copyright information to prove copyright of image contents.

What is claimed is:

1. An apparatus for embedding imperceptible codes into digital image data comprising:
   a data divider to divide, per frame, digital image data into an "N" number of fields wherein "N" being an integer of 2 or more;
   a code producer to produce an "m" number of combinations of imperceptible codes, each combination having a first imperceptible code and a second imperceptible code, the first imperceptible code being one of the "m" number of first imperceptible codes, the second imperceptible code being one of the "m" number of second imperceptible codes given by a specific function with each first imperceptible code and a specific identification code as variables, in which the specific identification code is given by the specific function with the first and second imperceptible codes of each combination as variables wherein "m" being an integer of 2 or more and given by dividing "N" by an integer; and
   a code embeder to embed the first and second imperceptible codes of each combination into image data of each of the divided fields according to a specific rule of positional correspondence that defines a positional relationship between the first and second imperceptible codes of each combination when embedded in each field of one frame.

2. An apparatus for extracting imperceptible codes from digital image data, the imperceptible codes being embedded into the digital image data by dividing, per frame, digital image data into an "N" number of fields wherein "N" being an integer of 2 or more, producing an "m" number of combinations of imperceptible codes, each combination having a first imperceptible code and a second imperceptible code, the first imperceptible code being one of the "m" number of first imperceptible codes, the second imperceptible code being one of the "m" number of second imperceptible codes given by a specific function with each first imperceptible code and a specific identification code as variables, in which the specific identification code is given by the specific function with the first and second imperceptible codes of each combination as variables wherein "m" being an integer of 2 or more and given by dividing "N" by an integer, and embedding the first and second imperceptible codes of each combination into image data of each of the divided fields according to a specific rule of positional correspondence that defines a positional relationship between the first and second imperceptible codes of each combination when embedded in each field of one frame, in which the apparatus is given information on the division condition of the digital image data divided into the "N" number of fields per frame, the specific identification code, the specific function and the specific rule of positional correspondence, the apparatus comprising:
   a data divider to divide, per frame, input digital image data into the "N" number of fields according to the division condition;
   a code extractor to extract the "N" number of imperceptible codes from the image data divided into the "N" number of fields according to a code extraction technique corresponding to the code embedding technique;
   a code-pair combiner to combine the extracted "N" number of imperceptible codes into the "m" number of combinations according to the division condition and the rule of positional correspondence;
   a code operator to conduct a specific operation to obtain the specific identification code by using the specific function with the imperceptible codes of each combination as variables; and
   a determiner to determine that the input digital image data has not been tampered with only when results of the specific operation is equal to the specific identification code for all of the "m" number of combinations.

3. A method of embedding imperceptible codes into digital image data comprising the steps of:
   dividing, per frame, digital image data into an "N" number of fields wherein "N" being an integer of 2 or more;
   producing an "m" number of combinations of imperceptible codes, each combination having a first imperceptible code and a second imperceptible code, the first imperceptible code being one of the "m" number of first imperceptible codes, the second imperceptible code being one of the "m" number of second imperceptible codes given by a specific function with each first imperceptible code and a specific identification code as variables, in which the specific identification code is given by the the specific function with the first and second imperceptible codes of each combination as variables wherein "m" being an integer of 2 or more and given by dividing "N" by an integer; and
   embedding the first and second imperceptible codes of each combination into image data of each of the divided fields according to a specific rule of positional correspondence that defines a positional relationship between the first and second imperceptible codes of each combination when embedded in each field of one frame.

4. A method of extracting imperceptible codes from digital image data, the imperceptible codes being embedded into the digital image data by dividing, per frame, digital image data into an "N" number of fields wherein "N" being an integer of 2 or more, producing an "m" number of combinations of imperceptible codes, each combination having a first imperceptible code and a second imperceptible code, the first imperceptible code being one of the "m" number of first imperceptible codes, the second imperceptible code being one of the "m" number of second imperceptible codes given by a specific function with each first imperceptible code and a specific identification code as variables, in which the specific identification code is given by the specific function with the first and second imperceptible codes of each combination as variables wherein "m" being an integer of 2 or more and given by dividing "N" by an integer, and embedding the first and second imperceptible codes of each combination into image data of each of the divided fields according to a specific rule of positional correspondence that defines a positional relationship between the first and second imperceptible codes of each combination when embedded in each field of one frame, in which the apparatus is given information on the division condition of the digital image data divided into the "N" number of fields per frame, the specific identification code, the specific function and the specific rule of positional correspondence, the method comprising the steps of:

dividing, per frame, input digital image data into the "N" number of fields according to the division condition;

extracting the "N" number of imperceptible codes from the image data divided into the "N" number of fields according to a code extraction technique corresponding to the code embedding technique;

combining the extracted "N" number of imperceptible codes into the "m" number of combinations according to the division condition and the rule of positional correspondence;

conducting a specific operation to obtain the specific identification code by using the specific function with the imperceptible codes of each combination as variables; and determining that the input digital image data has not been tampered with only when results of the specific operation is equal to the specific identification code for all of the "m" number of combinations.

5. A method of embedding imperceptible codes into digital image data by a computer comprising the steps of:

dividing, per frame, digital image data into an "N" number of fields wherein "N" being an integer of 2 or more;

producing an "m" number of combinations of imperceptible codes, each combination having a first imperceptible code and a second imperceptible code, the first imperceptible code being one of the "m" number of first imperceptible codes, the second imperceptible code being one of the "m" number of second imperceptible codes given by a specific function with each first imperceptible code and a specific identification code as variables, in which the specific identification code is given by the specific function with the first and second imperceptible codes of each combination as variables wherein "m" being an integer of 2 or more and given by dividing "N" by an integer; and embedding the first and second imperceptible codes of each combination into image data of each of the divided fields according to a specific rule of positional correspondence that defines a positional relationship between the first and second imperceptible codes of each combination when embedded in each field of one frame.

6. A method of extracting imperceptible codes from digital image data by a computer, the imperceptible codes being embedded into the digital image data by dividing, per frame, digital image data into an "N" number of fields wherein "N" being an integer of 2 or more, producing an "m" number of combinations of imperceptible codes, each combination having a first imperceptible code and a second imperceptible code, the first imperceptible code being one of the "m" number of first imperceptible codes, the second imperceptible code being one of the "m" number of second imperceptible codes given by a specific function with each first imperceptible code and a specific identification code as variables, in which the specific identification code is given by the specific function with the first and second imperceptible codes of each combination as variables wherein "m" being an integer of 2 or more and given by dividing "N" by an integer, and embedding the first and second imperceptible codes of each combination into image data of each of the divided fields according to a specific rule of positional correspondence that defines a positional relationship between the first and second imperceptible codes of each combination when embedded in each field of one frame, in which the apparatus is given information on the division condition of the digital image data divided into the "N" number of fields per frame, the specific identification code, the specific function and the specific rule of positional correspondence, the method comprising the steps of:

dividing, per frame, input digital image data into the "N" number of fields according to the division condition;

extracting the "N" number of imperceptible codes from the image data divided into the "N" number of fields according to a code extraction technique corresponding to the code embedding technique;

combining the extracted "N" number of imperceptible codes into the "m" number of combinations according to the division condition and the rule of positional correspondence;

conducting a specific operation to obtain the specific identification code by using the specific function with the imperceptible codes of each combination as variables; and determining that the input digital image data has not been tampered with only when results of the specific operation is equal to the specific identification code for all of the "m" number of combinations.

* * * * *